(12) United States Patent
Fonseca et al.

(10) Patent No.: US 11,507,720 B1
(45) Date of Patent: Nov. 22, 2022

(54) SYSTEMS AND METHODS FOR SIGNAL OBSERVABILITY RATING

(71) Applicant: Cadence Design Systems, Inc., San Jose, CA (US)

(72) Inventors: Matheus Nogueira Fonseca, Minas Gerais (BR); Thamara Karen Cunha Andrade, Minas Gerais (BR); Lars Lundgren, Mölnlycke (SE); Breno Guimaraes, Minas Gerais (BR)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/345,857

(22) Filed: Jun. 11, 2021

(51) Int. Cl.
*G06F 30/30* (2020.01)
*G01R 31/317* (2006.01)
*G06F 30/3323* (2020.01)
*G06F 30/3312* (2020.01)
*G06F 30/31* (2020.01)
*G06F 119/12* (2020.01)

(52) U.S. Cl.
CPC ... *G06F 30/3323* (2020.01); *G01R 31/31704* (2013.01); *G01R 31/31725* (2013.01); *G06F 30/31* (2020.01); *G06F 30/3312* (2020.01); *G06F 2119/12* (2020.01)

(58) Field of Classification Search
None
See application file for complete search history.

(56) References Cited

U.S. PATENT DOCUMENTS

| | | | | |
|---|---|---|---|---|
| 6,363,520 B1* | 3/2002 | Boubezari | ...... | G01R 31/318364 716/106 |
| 6,990,438 B1* | 1/2006 | Chowdhury | ............ | G06F 30/33 703/15 |
| 7,103,859 B2* | 9/2006 | Yamada | ......... | G01R 31/318342 702/181 |
| 7,432,742 B2* | 10/2008 | Johnson | ............... | G06F 11/348 327/24 |
| 10,796,051 B1 | 10/2020 | Marciano et al. | | |

* cited by examiner

*Primary Examiner* — Leigh M Garbowski
(74) *Attorney, Agent, or Firm* — Tarolli, Sundheim, Covell & Tummino LLP

(57) ABSTRACT

This disclosure relates to signal observability rating. In an example, a method can include propagating a clock signal through a respective module of a circuit design in a forward and backward direction, evaluating clock signal propagation results for the respective module based on a forward and backward clock signal propagation of the clock signal to compute an observability rating for a data signal to be processed by the respective module during formal verification, and updating a current observability rating of the respective property for the data signal to the computed observability rating.

19 Claims, 8 Drawing Sheets

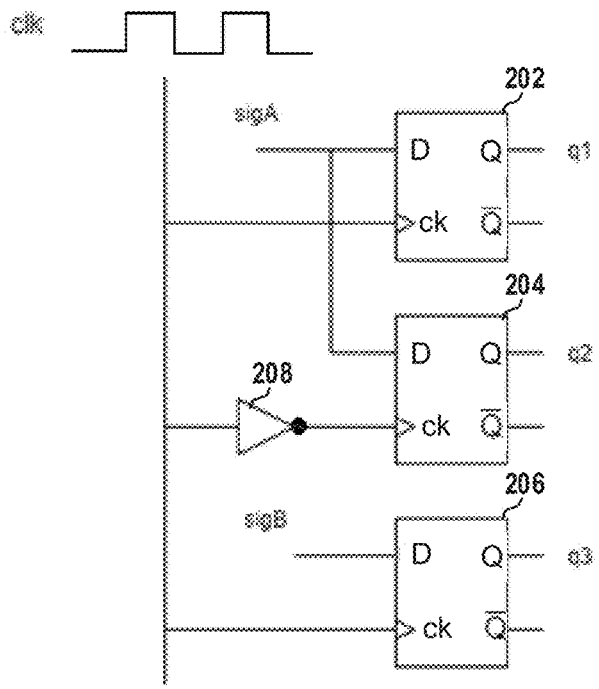

FIG. 2

```
Property p1: @(nedgedge clk) q1
Property p2: q2
Property p3: q3
```

FIG. 3

```
Property p1: @(nedgedge clk) q1         Input rating:
  - Error: property with incorrect        - sigA: both edges clk
sensitivy. Should be @(posedge clk) q1    - sigB: posedge clk
Property p2: q2
  - Warning: property sensitivity can be  Warning: sigB rate can be reduced
reduced to @(negedge clk) q2              to posedge clk.
Property p3: q3
  - Warning: property sensitivity can be
reduced to @(posedge clk) q3
```

FIG. 4

SYSTEMS AND METHODS FOR SIGNAL OBSERVABILITY RATING

TECHNICAL FIELD

This disclosure relates to electronic design automation (EDA) applications. More particularly, this disclosure relates to signal observability rating.

BACKGROUND

Existing verification and debugging tools are used in a design flow of a circuit. The design flow begins with the creation of a circuit design at a register transfer language (RTL) level using RTL source code. The RTL source code is specified according to a Hardware Description Language (HDL), such as Verilog HDL or VHDL. Circuit designers use high-level hardware description languages because of the size and complexity of modern integrated circuits. Circuit designs are developed in a high-level language using computer-implemented software applications, which enable a user to use text-editing and graphical design tools to create a HDL-based design. In the design flow, the creation of the RTL source code is followed by verification of the design to check if the RTL source code meets various design specifications. Formal verification is one such technique for verifying the circuit design. Formal verification uses mathematical techniques to prove that, under a set of constraints, a design property is either always correct or to provide an example condition (called a counterexample) that demonstrates the property is false. Design properties to be verified include specifications and/or requirements that must be satisfied by the circuit design. Since mathematical properties define the design requirements in mathematical terms, this enables analysis of all possible valid inputs for a given circuit and is akin to an exhaustive simulation.

SUMMARY

The present disclosure relates to signal observability rating.

In an example, a method comprises propagating a clock signal through a respective module of a circuit design in a forward and backward direction, evaluating clock signal propagation results for the respective module based on a forward and backward clock signal propagation of the clock signal to compute an observability rating for a data signal to be processed by the respective module during formal verification, and updating a current observability rating of the respective property for the data signal to the computed observability rating.

In yet another example, a method comprises propagating a first clock signal through a first module of a circuit design in a forward and backward direction, evaluating first clock signal propagation results based on a forward and backward clock signal propagation of the first clock signal to compute a first observability rating for a data signal to be processed by the first module during formal verification, propagating a second clock signal through a second module of the circuit design and through a portion of the first module in a forward and backward direction, evaluating second clock signal propagation results based on a forward and backward clock signal propagation of the second clock signal to compute a second observability rating for the data signal to be processed by the first module during formal verification, summing the first and second observability ratings to provide a summed observability rating for the data signal to be processed by the first module, and updating a current observability rating of the respective property for the data signal to be processed by the first module to the summed observability rating.

In a further example, a system can include memory to store machine-readable instructions and one or more processors to access the memory and execute the machine-readable instructions. The machine-instructions can include a property analyzer programmed to propagate a clock signal through a respective module of a circuit design in a forward and backward direction, and evaluate clock signal propagation results for the respective module based on a forward and backward clock signal propagation of the clock signal to compute an observability rating for a data signal to be processed by the respective module during formal verification. The machine-instructions can include a report generator programmed to evaluate the current observability rating for the data signal involved in the respective property relative to the computed observability rating for the data signal to determine whether the current observability rating for the data signal is correct and generate an observability report indicating that the current observability rating for the data signal is incorrect in response to determining that the current observability rating does not equal the computed observability rating.

BRIEF DESCRIPTION OF THE DRAWINGS

FIG. 2 is an example of a module in a circuit design.

FIG. 3 is an example of properties for verifying a circuit design.

FIG. 4 is an example of an observability report.

DETAILED DESCRIPTION

Figure 1:
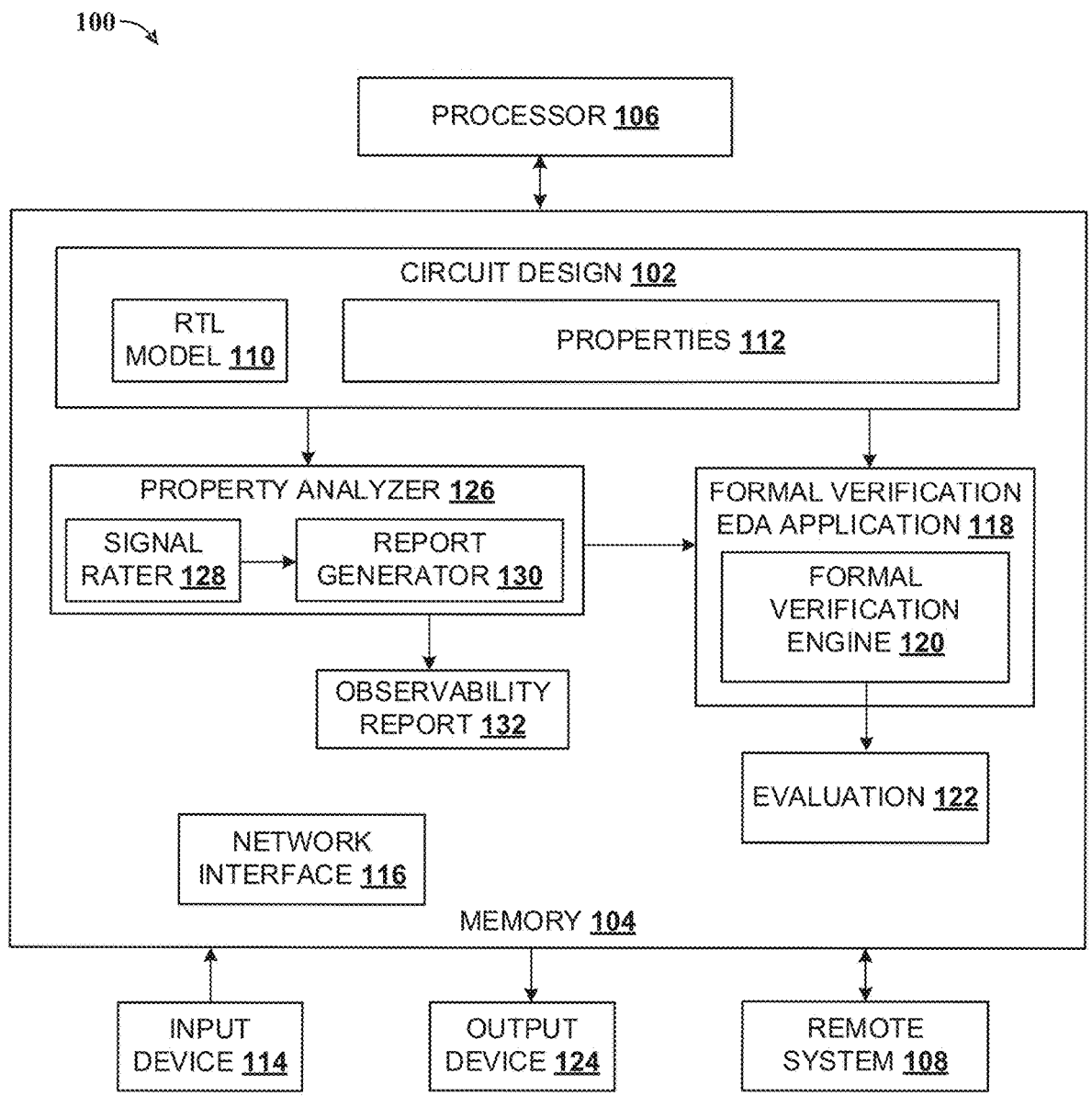
FIG. 1 is an example of a system for executing a formal verification of a circuit design.

The present disclosure relates to property observability rating. During formal verification, a circuit design can be tested by attempting to prove a correctness of a property that has been written for the circuit design. The property may be a specification or requirement that is to be satisfied by the circuit design and can describe a behavioral relationship between signals of the circuit design. The property can be verified by searching a state space using a formal verification engine. In some instances, a subset of states in the state space may have no meaning or may provide no information to a user. The subset of states can be reflected in a signal trace as transitions that can impact a user's ability to understand the signal trace or identify conditions or features (e.g., bugs).

Systems and methods are described herein for eliminating unwanted observations of one or more data signals for a respective property such that a number of space transitions that need to be evaluated during formal verification can be reduced. The systems and methods herein can reduce the need for a formal verification engine to evaluate all of the space transitions during formal verification of the circuit design. Moreover, because the systems and methods described herein can eliminate unwanted observations of the one or more data signals for the respective property the user can more readily understand or identify conditions or features (e.g., bugs) based on the signal trace.

In some examples, a property can be provided to a property analyzer. The property analyzer can implement a signal observability rating method to compute an observability rating for each data signal involved in the respective property. The property analyzer can determine an observability rating for each data signal involved in the property based on analysis and propagation of a clock signal, include edge sensitivity, through a circuit design. The property analyzer can propagate the clock signal through a respective module of the circuit design and analyze clock signal propagation results to compute a new observability rating for each data signal. The new observability rating may be indicative that a respective data signal is to be observed on a negative edge of the clock signal. A previous observability rating may have indicated that the respective data signal is to be observed on positive and negative edges of the clock signal and observability on the negative edge may have no functional meaning in a signal trace. Resultantly, a more complex model had to be evaluated by the formal engine based on the previous observability rating which takes more time for the formal engine to be able to find a signal trace, and this trace might be difficult to understand since the trace can include changes that do not represent any functional behavior and pollutes the signal trace (e.g., with noise). The property analyzer can update the respective property with the new observability rating for each data signal to reduce the number of space transitions that need to be evaluated during formal verification.

FIG. 1 illustrates an example of a system 100 for executing a formal verification of a circuit design 102. The system 100 can represent a computing platform. Accordingly, the system 100 can include a memory 104 for storing machine readable instructions and data and a processing unit 106 for accessing the memory 104 and executing the machine-readable instructions. The memory 104 represents a non-transitory machine-readable memory, such as random access memory (RAM), a solid state drive, a hard disk drive, or a combination thereof. The processing unit 106 can be implemented as one or more processor cores. The system 100 could be implemented in a computing cloud. In such a situation, features of the computing platform, such as the processing unit 106 and the memory 104 could be representative of a single instance of hardware or multiple instances of hardware with applications executing across the multiple instances (e.g., distributed) of hardware (e.g., computers, routers, memory, processors, or a combination thereof). Alternatively, the system 100 could be implemented on a single dedicated server or workstation.

The circuit design 102 can be stored in the memory 104. The circuit design 102 can be implemented, for example, as design specifications for an integrated circuit (IC) chip. The circuit design 102 can be generated with an EDA application, such as a logic synthesis application (e.g., a synthesis tool). In such a situation, an end-user (e.g., a circuit designer) of a remote system 108 can employ a user interface to generate and/or modify HDL code (e.g., Verilog) for generating an RTL model 110 (e.g., RTL code) characterizing a circuit, wherein the RTL model 110 is transformable by an EDA application into a physically realizable gate-level netlist for the circuit design 102. In some examples, the circuit design can be embodied in a data file encoded using HDL, which may describe a structure design and operation of the circuit.

Additionally, the circuit design 102 includes a set of properties 112 that can define at least one of a list of covers, constraints and assertions for the circuit design 102. Moreover, in examples where the circuit design 102 was generated with Verilog, the set of properties 112 may be referred to as SystemVerilog Assertions (SVAs). In some examples, a user (e.g., a circuit designer or verification engineer) may employ an input device 114 to supply requirements for the circuit design 102. The requirements can be encoded in a verification specification as the set of properties 112. In some examples, the verification specification can be directly coded by the user or captured in an automated process. A property may represent an assertion, where the assertion is satisfied if the property is true for (e.g., all) operating conditions of the circuit design 102.

By way of further example, the covers (alternatively referred to as a cover property) define states for the circuit design 102 that must be able to occur under certain conditions. Stated differently, each of the covers represents a logical value driven by a set of inputs. In order for a fabricated circuit based on the circuit design 102 to operate correctly, there must be a set of inputs that result in each respective logical value corresponding to the covers to be true (e.g., logical 1). If there are not a set of inputs under which the logical value for a given cover resolves to true (e.g., logical 1), the circuit design 102 has design errors (e.g., bugs). The assertions of the set of properties 112 can define states for the circuit design 102, which if occur on a fabricated IC chip for the circuit design 102 would indicate that the circuit design has design errors (e.g., bugs). In some examples, an assumption can specify that certain signals to and/or from the circuit design 102 may only take on predetermined values (e.g., 0 or 1) at certain clock cycles and/or at certain times when testing the circuit design 102 against the properties 112.

Stated differently, each of the assertions can represent a logical value driven by a set of inputs that should always be true. If there is a set of the inputs that result in the logical value of an assertion being false (e.g., logical 0), the circuit design 102 has design errors (e.g., bugs). The constraints (alternatively referred to as assumptions) of the one or more properties can define rules, such as input states for the RTL model 110 for operating the IC chip characterized by the circuit design 102. Such constraints, if violated, would cause errors in a fabricated IC chip corresponding to the circuit design 102, wherein simulation and/or formal verification of such violations of the constraints need not be evaluated. Stated differently, constraints can define illegal (unpermitted) states of the IC chip corresponding to the circuit design 102. Accordingly, in some examples, the properties 112 can describe a desired behavior of the circuit design 102.

As one example, the system 100 can receive the circuit design 102 that includes the RTL model 110 and/or the properties 112 via a network interface 116. The system 100 can store the circuit design 102 in the memory 104. By way of further example, the circuit design 102 can be provided by the remote system 108.

Before fabrication of an IC chip corresponding to the circuit design 102, the circuit design 102 can be subjected to formal verification. Formal verification refers to the process of establishing functional correctness between the RTL model 110 and the properties 112 without running simulations. More specifically, formal verification is an exhaustive mathematical analysis (e.g., of a mathematical model) to prove or disprove the correctness of a circuit design with respect to the properties 112 specifying intended design behavior. In chip hardware design, formal verification is a systematic process to verify that the design intent is preserved in the implementation (the RTL model 110). Given the huge number of states in even a small design, it is impractical to simulate more than a minuscule percentage of design behavior. Moreover, the simulation is probabilistic and the chances of exercising every scenario that would reveal a design bug are relatively small. Corner-case bugs, namely bugs that require very specific conditions to be triggered, are often missed in simulation. Formal verification statically analyzes the circuit design 102 for all possible input sequences (or some subset thereof) and all possible state values (or some subset thereof), checking to see if the covers can be satisfied and if the assertions can be violated. These violations of assertions are referred to as "counter-examples" since each represents a way in which the implementation does not match the specification of intended behavior.

The memory 104 includes a formal verification EDA application 118 that can be employed to execute a formal verification of the circuit design 102. More particularly, the formal verification EDA application 118 includes a formal verification engine 120 that can generate and output an evaluation 122 of the circuit design 102. Data characterizing the evaluation 122 can be output to an end-user at an output device 124 (e.g., a display, in some examples, a remote display operating on the remote system 108). In some examples, the evaluation 122 is generated by the formal verification engine 120 through an execution of a formal verification of the circuit design 102. In some examples, the evaluation 122 can include one or more signal traces computed during formal verification. The designer can employ an EDA application (e.g., a logic synthesis application) to update the circuit design 102, such that the formal verification engine 120 can re-execute the formal verification.

In some examples, the memory 104 can include a property analyzer 126. The property analyzer 126 can compute a sensibility list for one or more of the properties 112. The sensibility list can identify an updated (or new) observability rating for at least some data signals involved in a respective property of the properties 112. The term "observability rate" and its derivatives as used herein can refer to detecting a data signal on one of a positive edge of a clock signal, a negative edge of the clock signal, or on both of the positive and negative edges of the clock signal. The sensibility list can provide or identify a minimal observability rating for at least some of the data signals involved in the respective property, such as during formal verification of the circuit design 102.

In some instances, one or more data signals involved in a respective property of the one or more properties 112 during formal verification, may have an observability rating that has been set or defined for observation on the positive and negative edge of one or more clock signals. Thus, an initial observability rating for the one or more data signals may be defined by the user based on user input at the input device 114. Because an observability of a respective data signal of the one or more data signals on a respective edge of a clock signal may not be relevant or functionally have meaning to a user this can impact the user's ability to understand a signal trace provided by the formal verification engine 120, in some examples, as part of the evaluation 122.

As described herein, the property analyzer 126 can compute an updated observability rating for the one or more data signals involved in the respective property to reduce or eliminate unnecessary transitions in the signal trace. In some examples, the property analyzer 126 can report (e.g., as part of the observability report 132 or in another report) to the user if the initial rating configured by the user might not represent the observability in the design. In some examples, the property analyzer 126 can modify (or update or report) the respective property to update a current observability rating for the one or more data signals to a respective updated observability rating. Thus, the property analyzer 126 can modify (e.g., update or reduce) the observability rating of the one or more data signals for the respective property such that non-relevant (or unwanted) observations of the one or more data signals for the respective property are not present in the signal trace of the evaluation 122. Because the property analyzer 126 can eliminate unwanted observations of the one or more data signals for the respective property a number of space transitions that need to be evaluated during formal verification can be reduced. Thus, the property analyzer 126 can reduce the need for the formal verification engine 120 to evaluate all of the space transitions during formal verification for a module of the circuit design 102. Moreover, because the property analyzer 126 can eliminate unwanted observations of the one or more data signals for the respective property the user can more readily understand or identify conditions or features (e.g., bugs) based on the signal trace. In some examples, the property analyzer 126 can compute the sensibility list identifying an updated observability rating for the one or more data signals involved in the respective property. The property analyzer 126 can employ the sensibility list to modify the respective property and thus update an observability rating of the respective property corresponding to updating the current observability rating for the one or more data signals to the respective updated observability rating.

By way of example, the property analyzer 126 can employ a signal rater 128 to compute an observability rating for each data signal involved in the respective property. The signal rater 128 can compute (or determine) the observability rate for each data signal based on analysis and propagation of a clock signal, include edge sensitivity, associated with the respective property. For example, for a given data signal of the respective property, the respective property can specify (or indicate) that the given data signal has an observability rating on the positive and negative edge of the clock signal. The signal rater 128 can propagate the clock signal through a respective module of the circuit design 102 and analyze clock signal propagation results to compute a new observability rating for the given data signal. The new observability rating may be indicative that the given data signal is to be observed on the negative edge of the clock signal rather than the positive and negative edges of the clock signal. In other examples, the new observability rating may be indicative that the given data signal is to be observed on the positive edge of the clock signal rather than the positive and negative edges of the clock signal. The property analyzer 126 can update the respective property with the new observability rating for the given data signal.

In some examples, during formal verification of the circuit design 102, a data output signal involved in the respective property used for verifying (e.g., proving or disproving) the correctness of the circuit design 102 may be impacted by multiple different clock signals, such as a first clock signal and a second clock signal. The impact caused by the different clock signals on the data output signal can result in unnecessary and thus unwanted transitions in the signal trace, which can impact the user's readability of the signal trace and the performance of a mathematical formal model evaluated by the formal verification engine 120. Thus, the impact of the multiple different clock signals can cause the data output signal to be read and reflected in the signal trace corresponding to unnecessary transitions in the signal trace.

The signal rater 128 can compute an updated observability rating for the data output signal that results in the signal trace being provided without the unnecessary transitions caused by the different clock signals on the data output signal. For example, during signal observability rating, the signal rater 128 can compute a first observability rating based on the first clock signal and a second observability rating based on the second clock signal. The signal rater 128 can sum the first and second observability ratings to provide the updated observability rating.

By way of further example, during signal observability rating, the signal rater 128 can be employed to propagate the first and second clock signal through different modules of the circuit design 102 in a forward and backward direction. The signal rater 128 can evaluate respective clock signal propagation results for each module based on the forward and backward clock signal propagation of one of the first and second clock signals, including edge sensitivity, to compute the first and second observability ratings. For example, the first observability rating can indicate that the data output signal is to be observed on the positive edge of the second clock signal. The second observability rating can indicate that the data output signal is to be observed on the negative edge of the second clock signal. In some examples, during signal observability rating, the signal rater 128 can compute the updated observability rating for the data output signal by summing the first and second observability ratings. Thus, the updated observability rating for the data output signal can indicate that the data output signal is to be observed on the positive and negative edges of a respective clock signal (e.g., the first clock signal).

In some examples, the property analyzer 126 can include a report generator 130. The report generator 130 can generate an observability report 132. For example, in response to the signal rater 128 determining an observability rating for each data signal (e.g., input and output data signals) involved in the respective property, the signal rater 128 can provide each computed observability rating to the report generator 130. The report generator 130 can generate the observability report 132 based on the observability rating for each data signal (or a subset thereof) provided by the signal rater 128. In some examples, the report generator 130 can indicate in the observability report 132 that the observability rating for each data signal involved in the respective property should be updated to the observability rating for the data signal provided by the signal rater 128. For example, the report generator 130 can evaluate the observability rating for the data signal involved in the respective property relative to the observability rating for the data signal provided by the signal rater 128. If the observability ratings are different, the report generator 130 can provide the observability report 132 with an indication that the observability rating is incorrect. In some examples, the report generator 130 can provide a recommendation (e.g., to the user) in the observability report 132 to update the observability rating for the data signal to the observability rating for the data signal provided by the signal rater 128 and thus improve the user's ability to understand the signal trace (e.g., detect bugs). The observability report 132 can be rendered on the output device 124 to notify (or alert) the user of possible changes that the user can make to the observability rating(s) for the respective property.

Accordingly, the property analyzer 126 can determine a minimal sensibility list for the respective property and thereby reduce the number of space transitions evaluated by the formal verification engine. Because unwanted detections have been eliminated from an evaluation space unnecessary transitions in the signal trace provided by the formal verification engine 120 can be eliminated, such that the user can more readily understand or identify conditions or features (e.g., bugs) in the circuit design 102.

FIG. 2 illustrates an example of a module 200 in a circuit design that can be employed as part of the circuit design 102 of FIG. 1. Thus, reference can be made to the example of FIG. 1 in the following description of FIG. 2. The module 200 can be formed of logical circuit components that can include a first flop circuit 202, a second flop circuit 204, and a third flop circuit 206. The module 200 can further include a NOT gate 208. The first and third flop circuits 202 and 206 can receive a clock signal (labelled as "clk" in FIG. 2) at a respective clock input. As shown in FIG. 2, the NOT gate can 208 can receive the clock signal and provided an inverted clock signal to a clock input of the second flop circuit 204. The clock signal can be generated by a clock generator (not shown in FIG. 2). Each of the first, second, and third flop circuits 202, 204, and 206 can include respective data inputs (labelled as "D" in FIG. 2), and respective outputs (labelled as "Q" in FIG. 2). Each of the first and second flop circuits 202 and 204 can receive a first data input signal (labelled as "sigA" in FIG. 2) at the respective data input. The third flop circuit 206 can receive a second data input signal (labelled as "sigB" in FIG. 2) at the respective data input. As shown in FIG. 2, each of the first, second, and third flop circuits 202, 204, and 206 can provide a respective data output signal (labelled as "q1", "q2" and "q3," respectively) based on the clock signal.

In some examples, the properties 112 can include a respective property that identifies an observability rating for the data output signals, as shown in FIG. 2. The respective property can be provided to the property analyzer 126 to determine if an updated observability rating exists for one or more data output signals of the output signals, as shown in FIG. 2. In some examples, the property analyzer 126 can compute an updated observability rate for the input and output data signals based on an analysis and propagation of the clock signal, include edge sensitivity in a forward and backward direction with respect to each flop circuit 202, 204, and 206. Thus, the property analyzer 126 can determine updated observability ratings, such that unnecessary transitions in a corresponding signal trace can be reduced or eliminated enabling the user can more readily understand or identify conditions or features (e.g., bugs) in the circuit design 102.

For example, the property analyzer 126 can compute a first observability rating for the first data input signal indicating that the first data input signal is to be observed on a positive edge and a negative edge of the clock signal. In some examples, the property analyzer 126 can compute a second observability rating for the second data input signal indicating that the second data input signal is to be observed on the positive edge of the clock signal. In further examples, the property analyzer 126 can compute a third observability rating for the first data output signal indicating that the first data output signal is to be observed on the positive edge of the clock signal. In further examples, the property analyzer 126 can compute a fourth observability rating for the second data output signal indicating that the second data output signal is to be observed on the negative edge of the clock signal. In some examples, the property analyzer 126 can compute a fifth observability rating for the third data output signal indicating that the third data output signal is to be observed on the positive edge of the clock signal. The computed observability ratings can be provided to the report generator 130, which can provide the observability report 132 based on such ratings.

FIG. 3 is an example of properties 300 for testing a circuit design, such as the circuit design 102. In some examples, the properties 300 can be or form part of the properties 112, as shown in FIG. 1. Thus, reference can be made to the example of FIGS. 1-2 in the following description of FIG. 3. The properties 300 may have been provided by a user via the input device 114, as shown in FIG. 1. The properties 300 can include a first property (referred to as "p1" in FIG. 3), a second property (referred to as "p2" in FIG. 3), and a third property (referred to as "p3" in FIG. 3). The first property indicates that a first data output signal (referred to as "q1" in FIG. 3) is to be observed on a negative edge of a clock signal. The first data output signal can correspond to the first data output signal, as shown in FIG. 2.

The second and third properties of the properties 300 indicate that respective second and third output signals (referred to as "q2" and "q3," respectively in FIG. 3) are to be observed on positive and negatives of the clock signal. The second and third data output signals can correspond to the second and third data output signals, as shown in FIG. 2. In some examples, the first, second, and third output signals can correspond to the first, second, and third output signals, as shown in FIG. 2. The properties 300 can be provided to the property analyzer 126. As described herein, the property analyzer 126 can determine an observability rating for each of the first, and second, and third output signals (or a subset thereof) based on analysis and propagation of the clock signal, including edge sensitivity, such that unnecessary transitions in a corresponding signal trace can be reduced or eliminated enabling the user can more readily understand or identify conditions or features (e.g., bugs) in the circuit design 102. In some examples, the property analyzer 126 can generate an observability report, such an observability report 400, as shown in FIG. 4.

As shown in FIG. 4, the observability report 400 can indicate whether a property has a proper sensitivity (e.g., observability rating), and can provide a recommendation for an observability rating for each data output signal that may be reduced or should be changed. For example, the observability report 400 indicates that the observability rating for the first data output signal is incorrect and should be updated to the positive edge of the clock signal rather than the negative edge of the clock signal, as shown in FIG. 3. By way of further example, the observability report 400 can indicate that the observability rating for the second data output signal can be reduced to the negative edge of the clock signal rather than to both the positive and negative edges of the clock signal and thus eliminate unnecessary transitions in a corresponding signal trace.

The observability report 400 can indicate that the observability rating for the third data output signal can be reduced to the positive edge of the clock signal rather than to both the positive and negative edges of the clock signal and thus eliminate unnecessary transitions in the corresponding signal trace. In some examples, the observability report 400 can indicate that the observability rating for a data input signal can be reduced. For example, the observability report 400 indicates that the observability rate for the second data input signal of FIG. 2 can be reduced to a positive edge of the clock signal, which currently may be set to both the positive and negative edges of the clock signal. Accordingly, the observability report 400 may be used for removing unwanted transitions in the signal trace during formal verification of the circuit design 102, and thus improving a user's ability to understand or identify conditions or features (e.g., bugs) in the circuit design 102 using the signal trace.

Figure 5:
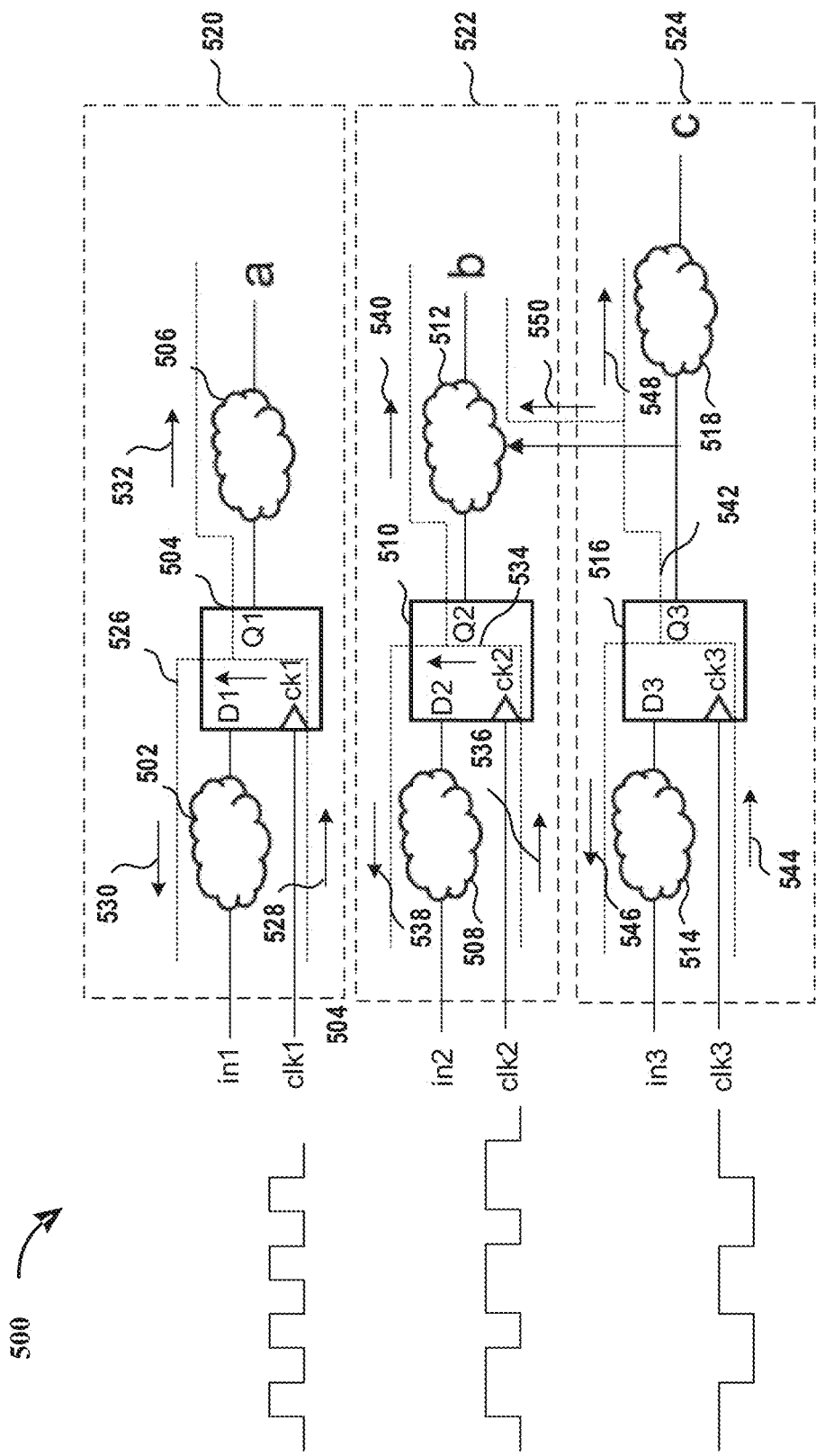
FIG. 5 is an example of a circuit design partition.

FIG. 5 is an example of a circuit design partition 500 with clock inputs and input/output signals. The circuit design partition 500 can be part of the circuit design 102, as shown in FIG. 1. Thus, reference can be made to the example of FIG. 1 in the following description of FIG. 5. The circuit design partition 500 can include a first cloud 502. The first cloud 502 can receive a first data input signal (labelled as "in1" in FIG. 5). The first cloud 502 can propagate the first data input signal to a first data input (labelled as "D1" in FIG. 5) of a first flop circuit 504. The first flop circuit 504 can output a first intermediate signal at a first data output (labelled as "Q1" in FIG. 5) for a second cloud 506 based on the first data input signal according to a first clock signal (labelled as "clk1" in FIG. 5) received at a first clock input (labelled as "ck1" in FIG. 5) of the first flop circuit 504. The second cloud 506 can provide a first data output signal (labelled as "a" in FIG. 5) based on the first intermediate signal.

The circuit design partition 500 can include a third cloud 508. The third cloud 508 can receive a second data input signal (labelled as "in2" in FIG. 5). The third cloud 508 can propagate the second data input signal to a second data input (labelled as "D2" in FIG. 5) of a second flop circuit 510. The second flop circuit 510 can output a second intermediate signal at a second data output (labelled as "Q2" in FIG. 5) for a fourth cloud 512 based on the second data input signal according to a second clock signal (labelled as "clk2" in FIG. 5) received at a second clock input (labelled as "ck2" in FIG. 5) of the second flop circuit 510. In some examples, the fourth cloud 512 can receive a third intermediate signal. The fourth cloud 512 can provide a second data output signal (labelled as "b" in FIG. 5) based on the second and third intermediate signals.

The circuit design partition 500 can include a fifth cloud 514. The fifth cloud 514 can receive a third data input signal (labelled as "in3" in FIG. 5). The fifth cloud 514 can propagate the third data input signal to a third data input (labelled as "D3" in FIG. 5) of a third flop circuit 516. The third flop circuit 516 can output the third intermediate signal at a third data output (labelled as "Q3" in FIG. 5) of the third flop circuit 516 for a sixth cloud 518 based on the third data input signal according to a third clock signal (labelled as "clk3" in FIG. 5) received at a third clock input (labelled as "ck3" in FIG. 5) of the third flop circuit 516. As shown in FIG. 5, the third intermediate signal is provided to the fourth cloud 512. The sixth cloud 518 can provide a third data output signal (labelled as "c" in FIG. 5) based on the third intermediate signal. In some examples, the first cloud 502, the first flop circuit 504, and the third cloud 506 can define or form a first module 520. The third cloud 508, the second flop circuit 510, and the fourth cloud 512 can define or form a second module 522. The fifth cloud 514, the third flop circuit 516, and the sixth cloud 518 can define or form a third module 524.

In some examples, a respective property may be defined for testing the circuit design partition 500. The respective property may be defined by a user and can be stored as part of the properties 112, as shown in FIG. 1. For example, the respective property for testing the circuit design partition 500 can be: "Property p1: (a && b && c)." In the respective property, each of the first, second, and third data output signals can have an observability rating that is set such that the first, second, and third data output signals during formal verification are observed on positive and negative edges of one of the first, second, and third clock signals. In some examples, the respective property can be evaluated by the property analyzer 126 to avoid unnecessary transitions in a corresponding signal trace that may be provided by the formal verification engine 120 during formal verification of the circuit design partition 500. The property analyzer 126 can implement a signal observability rating method to compute (or determine) updated observability ratings for the first, second, and/or third clock signals to reduce or eliminate signal transitions for the mathematical model thereby reducing the number of state spaces, which results in a cleaner signal trace with no irrelevant signal transitions.

In some examples, a positive edge of the second clock signal can transition over a similar period of time as a positive edge of the first clock signal, and a negative edge of the third clock signal can transition over a similar period of time as a negative edge of the first clock signal. Because the positive edge of the second clock signal transitions over the similar period of time as the positive edge of the first clock signal, the property analyzer 126 can compute observability ratings for the second data output signal with observations that are based on the positive edge of the first clock signal. Moreover, because the negative edge of the third clock signal can transition over the similar period of time as the negative edge of the first clock signal, the property analyzer 126 can compute observability ratings for the third data output signal with observations that are based on the negative edge of the first clock signal.

In some examples, during the signal observability rating method, the signal rater 128 can propagate the first clock signal along a first clock propagation path 526. For example, the signal rater 128 can propagate the first clock signal in a first direction 528 along the first clock propagation path 526 toward the first clock input of the first flop circuit 504. In response to reaching the first flop circuit 504, the signal rater 128 can trigger a backward propagation starting at the first data input of the first flop circuit 504 in a second direction 530 along the first clock propagation path 526 through the first cloud 502. In some examples, in response to reaching the first flop circuit 504, the signal rater 128 can propagate the first clock signal starting at the first data output in a third direction 532 along the first clock propagation path 526 through the second cloud 506. Accordingly, during the signal observability rating method, the property analyzer 126 can be employed to propagate the first clock signal through the first module 520 in a forward and backward direction.

In some examples, during the signal observability rating method, the signal rater 128 can propagate the first clock signal forward and calculate an edge sensitivity along the first clock propagation path 526. For example, when the first clock signal reaches the first flop circuit 504, the signal rater 128 can detect that the first flop circuit 504 is sensible to a positive edge of the first clock signal. Thus, the signal rater 128 can determine an observability rating for the first clock signal at the first flop circuit 504 is on the positive edge of the first clock signal. The signal rater 128 can continue propagating the positive edge of the first clock signal through the first data input and the first data output of the first flop circuit 504.

In some examples, when the propagation reaches an undriven input, for example, the first data input signal, the signal rater 128 can check if an observability rating for the first data input signal matches the observability rate determined at the first flop circuit 504. If the observability ratings do not match (e.g., the first data input signal changes on both edges of the first clock signal), the signal rater 128 we can communicate to the report generator 130 that there is a mismatch, or simplify a mathematical model used during formal verification automatically. In some examples, when the propagation reaches an undriven output, for example, the first data output signal, the signal rater 128 can check if an observability rating for the first data output signal matches the observability rate determined at the first flop circuit 504. If the observability ratings do not match (e.g., the first data output signal changes on both edges of the first clock signal), the signal rater 128 can communicate to the report generator 130 that there is a mismatch, or simplify the mathematical model used during formal verification automatically.

The report generator 130 can provide the observability report 132 identifying the mismatch in the observability report 132. In some examples, the proper analyzer 126 can communicate the observability rating determined during the signal observability rating method to the formal verification engine 120, which can simplify the mathematical model based on the determined observability rating. The property analyzer 126 can evaluate first clock signal propagation results for the first module 520 based on the forward and backward clock signal propagation of the first clock signal, including edge sensitivity, to compute a first observability rating. In some examples, the first clock signal propagation results can characterize the observability rating of the first data input signal with respect to the propagation of the first clock signal. In further examples, the first clock signal propagation results can characterize the observability rating of the first data output signal with respect to the propagation of the first clock signal. For example, the first observability rating can indicate that the first data output signal is to be observed on the positive edge of the first clock signal. In some examples, the first observability rating can indicate that the first data input signal to the first module 520 and the first clock signal are to be observed on the positive edge of the first clock signal. In further examples, the first observability rating may indicate that the first data input signal and the first clock signal provided to the first module 520 are to be observed on the positive edge of the first clock signal.

In some examples, during the signal observability rating method, the signal rater 128 can propagate the second clock signal along a second clock propagation path 534. For example, the signal rater 128 can propagate the second clock signal in a first direction 536 along the second clock propagation path 534 toward the second clock input of the second flop circuit 510. In response to reaching the second flop circuit 510, the signal rater 128 can trigger a backward propagation starting at the second data input of the second flop circuit 510 in a second direction 538 along the second clock propagation path 534 through the third cloud 508. In some examples, in response to reaching the second flop circuit 510, the signal rater 128 can propagate the first clock signal starting at the second data output in a third direction 540 along the second clock propagation path 534 through the fourth cloud 512. Accordingly, during the signal observability rating method, the property analyzer 126 can be employed to propagate the second clock signal through the second module 522 in a forward and backward direction.

In some examples, during the signal observability rating method, the signal rater 128 can propagate the second clock signal, and calculate an edge sensitivity of the second clock signal along the second clock propagation path 534. For example, when the second clock signal reaches the second flop circuit 510, the signal rater 128 can detect that the first flop circuit 504 is sensible to a positive edge of the second clock signal. Thus, the signal rater 128 can determine an observability rating for the second clock signal at the second flop circuit 510 is on the positive edge of the second clock signal. The signal rater 128 can continue propagating the positive edge of the second clock signal through the second data input and the second data output of the second flop circuit 510.

In some examples, when the propagation reaches an undriven input, for example, the second data input signal, the signal rater 128 can check if an observability rating for the second data input signal matches the observability rate determined at the second flop circuit 510. If the observability ratings do not match (e.g., the second data input signal changes on both edges of the second clock signal), the signal rater 128 can communicate to the report generator 130 that there is a mismatch, or simplify a mathematical model used during formal verification automatically. In some examples, when the propagation reaches an undriven output, for example, the second data output signal, the signal rater 128 can check if an observability rating for the second data output signal matches the observability rate determined at the second flop circuit 504. If the observability ratings do not match (e.g., the second data output signal changes on both edges of the second clock signal), the signal rater 128 can communicate to the report generator 130 that there is a mismatch, or simplify the mathematical model used during formal verification automatically. The report generator 130 can provide the observability report 132 identifying the mismatch in the observability report 132. In some examples, the proper analyzer 126 can communicate the observability rating determined during the signal observability rating method to the formal verification engine 120, which can simplify the mathematical model based on the determined observability rating.

The property analyzer 126 can evaluate second clock signal propagation results for the second module 522 based on the forward and backward clock signal propagation of the second clock signal, including edge sensitivity, to compute a second observability rating. In some examples, the second clock signal propagation results can characterize the observability rating of the second data input signal with respect to the propagation of the second clock signal. In further examples, the second clock signal propagation results can characterize the observability rating of the second data output signal with respect to the propagation of the second clock signal. For example, the second observability rating can indicate that the second data output signal is to be observed on the positive edge of the second clock signal. Because the positive edge of the second clock signal transitions over the similar period of time as the positive edge of the first clock signal, the property analyzer 126 can provide the second observability rating with an indication that the second data output signal is to be observed on the positive edge of the first clock signal. In further examples, the second observability rating may indicate that the second data input signal and the second clock signal provided to the second module 522 are to be observed on the positive edge of the first clock signal.

In some examples, during the signal observability rating method, the signal rater 128 can propagate the third clock signal along a third clock propagation path 542. For example, the signal rater 128 can propagate the third clock signal in a first direction 544 toward the third input of the third flop circuit 516 along the third clock propagation path 542. In response to reaching the third flop circuit 516, the signal rater 128 can trigger a backward propagation starting at the third data input of the third flop circuit 516 in a second direction 546 through the fifth cloud 514. In some examples, in response to reaching the third flop circuit 516, the signal rater 128 can propagate the third clock signal from the third data output in a third direction 548 along the third clock propagation path 542 through the sixth cloud 518. In some examples, in response to reaching the third flop circuit 516, the signal rater 128 can propagate the third clock signal along the third clock propagation path 542 in a fourth direction 550 through the fourth cloud 512. Accordingly, during the signal observability rating method, the property analyzer 126 can be employed to propagate the third clock signal through the third module 524 in a forward and backward direction.

In some examples, during the signal observability rating method, the signal rater 128 can propagate the third clock signal, and calculate an edge sensitivity of the third clock signal along the third clock propagation path 542. For example, when the third clock signal reaches the third flop circuit 516, the signal rater 128 can detect that the third flop circuit 516 is sensible to a negative edge of the third clock signal. Thus, the signal rater 128 can determine an observability rating for the third clock signal at the third flop circuit 516 is on the negative edge of the third clock signal. The signal rater 128 can continue propagating the negative edge of the third clock signal through the third data input and the third data output of the third flop circuit 516.

In some examples, when the propagation reaches an undriven input, for example, the third data input signal, the signal rater 128 can check if an observability rating for the third data input signal matches the observability rate determined at the third flop circuit 516. If the observability ratings do not match (e.g., the third data input signal changes on both edges of the third clock signal), the signal rater 128 can communicate to the report generator 130 that there is a mismatch, or simplify a mathematical model used during formal verification automatically. In some examples, when the propagation reaches an undriven output, for example, the third data output signal, the signal rater 128 can check if an observability rating for the third data output signal matches the observability rate determined at the third flop circuit 516. If the observability ratings do not match (e.g., the third data output signal changes on both edges of the third clock signal), the signal rater 128 can communicate to the report generator 130 that there is a mismatch, or simplify the mathematical model used during formal verification automatically. The report generator 130 can provide the observability report 132 identifying the mismatch in the observability report 132. In some examples, the proper analyzer 126 can communicate the observability rating determined during the signal observability rating method to the formal verification engine 120, which can simply the mathematical model based on the determined observability rating.

The property analyzer 126 can evaluate third clock signal propagation results for the third module 524 based on the forward and backward clock signal propagation of the third clock signal, including edge sensitivity, to compute a third observability rating. In some examples, the third clock signal propagation results can characterize the observability rating of the third data input signal with respect to the propagation of the third clock signal. In further examples, the third clock signal propagation results can characterize the observability rating of the third data output signal with respect to the propagation of the third clock signal. For example, the third observability rating can indicate that the third data output signal is to be observed on the negative edge of the third clock signal. Because the negative edge of the third clock signal transitions over the similar period of time as the negative edge of the first clock signal, the property analyzer 126 can provide the third observability rating with an indication that the third data output signal is to be observed on the negative edge of the first clock signal. In further examples, the third observability rating may indicate that the third data input signal and the third clock signal provided to the third module 524 are to be observed on the negative edge of the first clock signal.

In some examples, the observability of the second data output signal may be impacted by the second clock signal and the third clock signal, such as during formal verification. For example, as shown in FIG. 5, the second output signal is impacted by the second and third clock signals. The impact caused by the different clock signals on the second data output signal can result in unnecessary and thus unwanted transitions in the corresponding signal trace, which can impact the users' readability of the signal trace. Thus, the impact of the second and third clock signals can cause the second clock signal to be read and reflected in the signal trace corresponding to the unnecessary transitions. In some examples, during signal observability rating, the property analyzer 126 can compute an updated observability rating for the second data output signal that results in the signal trace being provided without the unnecessary transitions caused by the different clock signals on the second data output signal.

In some examples, during signal observability rating, the property analyzer 126 can propagate the third clock signal through a portion of the second module 522 in the forward direction in the fourth direction 550 along the third clock propagation path 542. In some examples, when the propagation of the third clock signal reaches an undriven input, for example, the second data input signal, the signal rater 128 can check if an observability rating for the second data output signal matches the observability rate determined at the third flop circuit 516. If the observability ratings do not match (e.g., the second data output signal changes on a respective edge of the second clock signal), the signal rater 128 we can communicate to the report generator 130 that there is a mismatch, or simplify the mathematical model used during formal verification automatically. The report generator 130 can provide the observability report 132 identifying the mismatch in the observability report 132. In some examples, the proper analyzer 126 can communicate the observability rating determined during the signal observability rating method to the formal verification engine 120, which can simply the mathematical model based on the determined observability rating.

The property analyzer 126 can evaluate fourth clock signal propagation results based on the forward clock signal propagation of the third clock signal through the portion of the second module, including edge sensitivity, to compute a fourth observability rating. In some examples, the fourth clock signal propagation results can characterize the observability rating of the second data output signal with respect to the propagation of the third clock signal. The fourth observability rating can indicate that the second data output signal is to be observed on the negative edge of the third clock signal. Because the negative edge of the third clock signal transitions over the similar period of time as the negative edge of the first clock signal, the property analyzer 126 can provide the fourth observability rating with an indication that the second data output signal is to be observed on the negative edge of the first clock signal.

Accordingly, in some examples, the second data output signal is observable on both of the second and third clock signals corresponding to the positive edge of the second clock signal and the positive edge of the third clock signal. In some examples, the proper analyzer 126 can verify if a property that checks a behavior in the second data output signal is being able to observe all changes in the signal. For example, a respective property such as "@(posedge clk2) a1->b" might be missing changes in the second data output signal as a result of the positive edge of the third clock signal. This kind of flaw in the property sampling may hide bugs in the circuit design.

In some examples, during signal observability rating, the property analyzer 126 can compute the updated observability rating for the second data output signal by summing (e.g., merging) the second and fourth observability ratings. Thus, the updated observability rating for the second data output signal can indicate that the second data output signal is to be observed on the positive and negative edges of the first clock signal. In further examples, during signal observability rating, the property analyzer 126 can compute a sensibility list based on the first observability rating for the first output signal, the updated observability rating for the second output signal, and the third observability rating for the third data output signal. The sensibility list can identify a minimal number of observability ratings for the respective property. The property analyzer 126 can employ the computed sensibility list to update the respective property for testing the circuit design partition 500. For example, the property analyzer 126 can update the property to: "Property p1: @ (posedge clk1 or negedge clk1) (a && b && c)," which can result in the observability of the first data output signal on the positive edge of the first clock signal, the second data output signal on the positive and negative edges of the first clock signal, and the third data output signal on the negative edge of the first clock signal.

Figure 6:
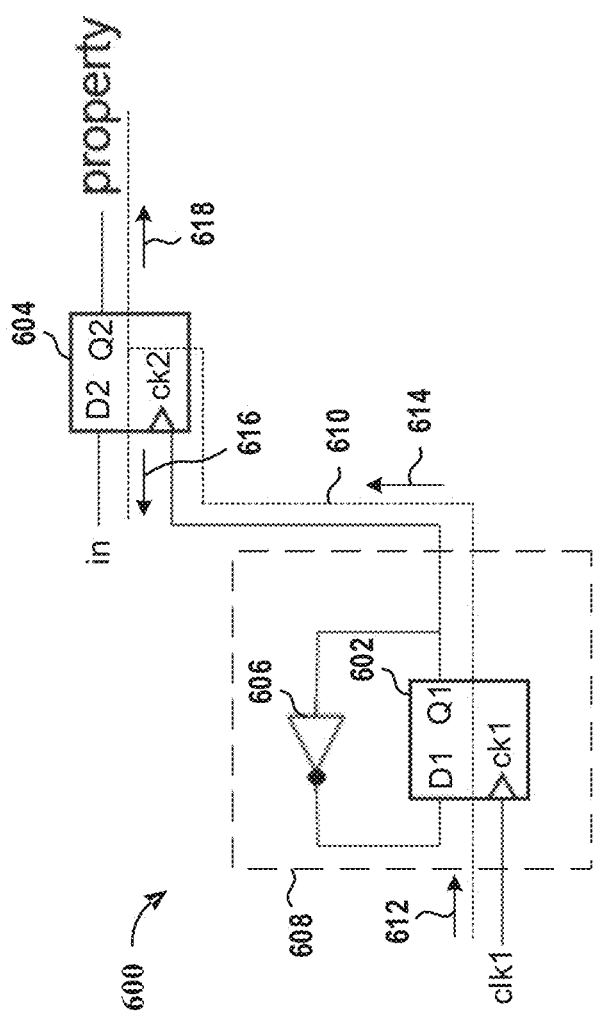
FIG. 6 is an example of a circuit design partition with a clock divider.

FIG. 6 is an example of a circuit design partition 600 with a clock divider 602. The circuit design partition 600 can be part of the circuit design 102, as shown in FIG. 1. Thus, reference can be made to the example of FIG. 1 in the following description of FIG. 6. The circuit design partition 600 can include a first flop circuit 602, a second flop circuit 604, and a NOT gate 606. The first and second flop circuits 602 and 604 can be implemented similar to the first and second flop circuits 202 and 204, as shown in FIG. 1. In some examples, the NOT gate 606 can be coupled between a first data input (labelled as "D1" in FIG. 6) of the first flop circuit 604 and a first data output (labelled as "Q1" in FIG. 6). The NOT gate 606 and the first flop circuit 606 can define or form a clock divider 608. The clock divider 608 can receive a clock signal (labelled as "clk1" in FIG. 6). The clock divider 608 can output a divided clock signal to the second flop circuit 604 that can transition at a reduced rate than the clock signal. In some examples, the second flop circuit 604 can receive at a second data input (labelled as "D2" in FIG. 6) a data input signal (labelled as "in" in FIG. 6). Changes in a property (labelled as "property" as shown in FIG. 6) at a second data output (labelled as "Q2" in FIG. 6) can be observed at a reduced rate (e.g., one or more data signal of the property). In some examples, the property is a data output signal. Thus, in some examples, the second flop circuit 604 can output the data output signal based on the data input signal according to the divided clock signal.

In some examples, during a signal observability rating method, such as described herein, the signal rater 128 can propagate the clock signal along a clock propagation path 612. For example, the signal rater 128 can propagate the clock signal in a first direction 612 toward a first clock input (labelled as "ck1" in FIG. 6) of the first flop circuit 602 along the clock propagation path 610. In response to reaching the first flop circuit 602, the signal rater 128 can trigger propagation of the clock signal starting at the first data output of the first flop circuit 602 in a second direction 614 toward the second flop circuit 604. In response to reaching the second flop circuit 604, the signal rater 128 can trigger a backward propagation starting at the second data input of the second flop circuit 604 in a third direction 616. In some examples, in response to reaching the second flop circuit 604, the signal rater 128 can propagate the clock signal along the clock propagation path 610 in a fifth direction 618. Accordingly, during the signal observability rating method, the property analyzer 126 can be employed to propagate the clock signal through the circuit design partition 600 in a forward and backward direction. The property analyzer 126 can evaluate clock signal propagation results for the circuit design partition 600 based on the forward and backward clock signal propagation of the clock signal, including edge sensitivity, to compute an observability rating. The observability rating can indicate that the property is to be observed on a respective edge of the clock signal. In some examples, the observability rating can indicate that the data input signal can be observed on the respective edge of the clock signal. Because the clock divider signal is twice the rate of the clock signal, the data input signal can be detected at twice the rate of the clock signal.

Figure 7:
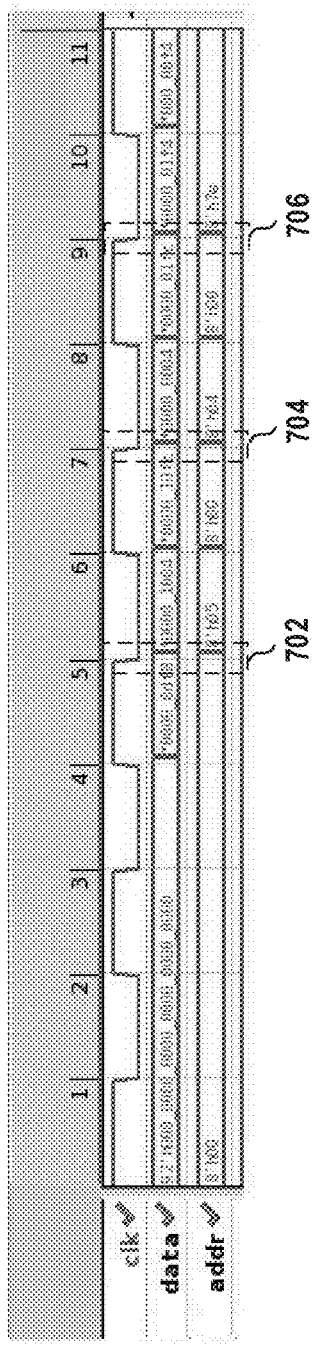
FIG. 7 is an example of a signal trace with unnecessary transitions.

FIG. 7 is an example of a signal trace 700 exhibiting unnecessary transitions. For example, the signal trace 700 can be generated based on one or more properties that have not been updated by the property analyzer 126, as shown in FIG. 1. For example, the signal trace 700 includes a clock signal (referred to as "clk" in FIG. 7), a first data signal (referred to as "data" in FIG. 7), and a second data signal (referred to as "addr" in FIG. 7). As shown at 702, 704, and 706, the signal trace 700 exhibits transitions that have no functionality (e.g., to a user), and thus make it difficult for the user to detect errors (e.g., bugs). This is because the observability rating for the first and second data signals as defined by the one or more properties is read (e.g., observed) on both of the positive and negatives edges of the clock signal.

Figure 8:
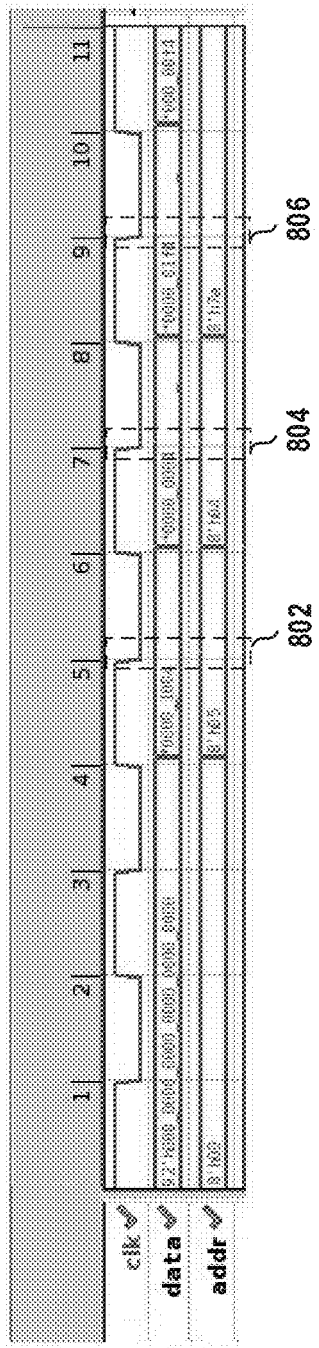
FIG. 8 is an example of a signal trace without unnecessary transitions.

FIG. 8 is an example of signal trace 800 without unnecessary transitions. The signal trace 800 can be generated based on one or more properties that have been updated according to the property analyzer 126, as shown in FIG. 1. For example, the signal trace 800 includes a clock signal (referred to as "clk" in FIG. 8), a first data signal (referred to as "data" in FIG. 8), and a second data signal (referred to as "addr" in FIG. 8). As shown at 802, 804, and 806, the signal trace 800 does not exhibit the transitions as at 702, 704, and 706, as shown in FIG. 7, which can confuse the user and make it difficult for the user to detect errors (e.g., bugs). This is because the property analyzer 126 updated the one or more properties, such that an observability of the first and second signals is on a positive edge of the clock signal. As described herein, the property analyzer 126 can modify observability ratings of the first and second signals involved in the properties, such that the first and second signals are observed on the positive edge of the clock signal, as shown in the signal trace 800.

Figure 9:
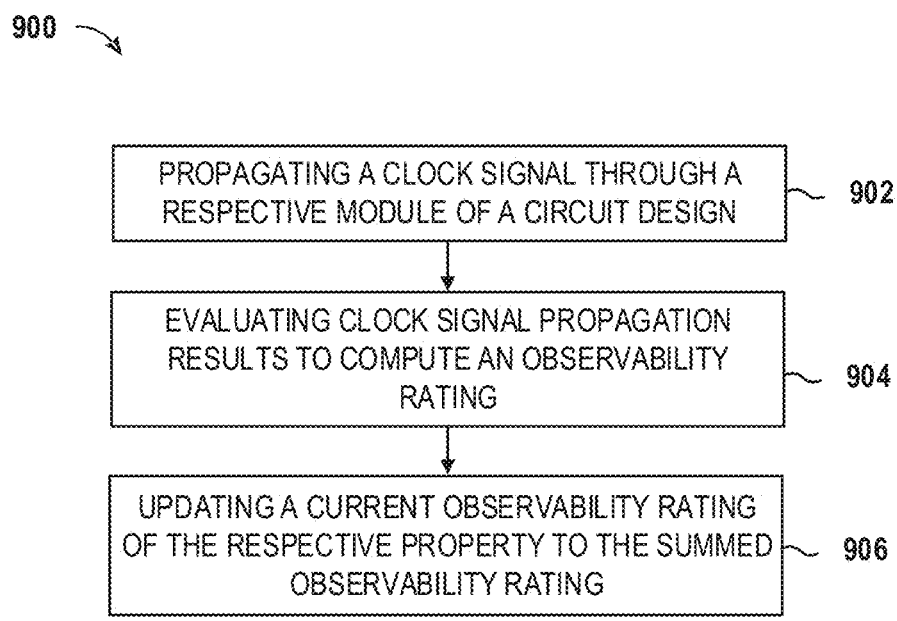
FIG. 9 is an example of a method for computing a signal observability rating.
Figure 10:
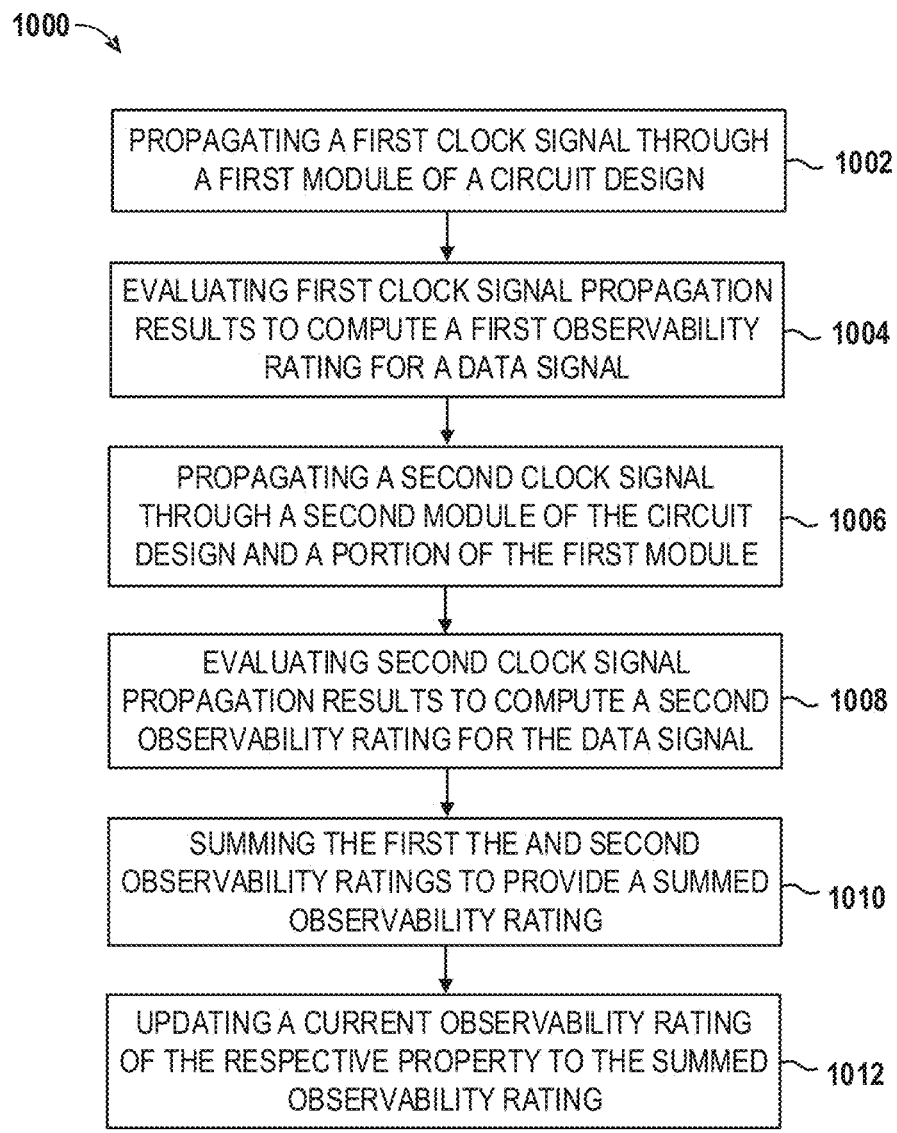
FIG. 10 is an example of another method for computing a signal observability rating.

In view of the foregoing structural and functional features described above, an example method will be better appreciated with references to FIGS. 9-10. While, for purposes of simplicity of explanation, the example methods of FIGS. 9-10 is shown and described as executing serially, it is to be understood and appreciated that the example methods are not limited by the illustrated order, as some actions could in other examples occur in different orders, multiple times and/or concurrently from that shown and described herein.

FIG. 9 is an example of a method 900 for computing a signal observability rating for a signal involved in a respective property. The method 900 can be implemented by the property analyzer 126, as shown in FIG. 1. The method 900 can begin at 902 by propagating a clock signal through a respective module of a circuit design in a forward and backward direction. At 904, evaluating clock signal propagation results for the respective module based on a forward and backward clock signal propagation of the clock signal to compute an observability rating for a data signal to be processed during formal verification of the respective module. At 906, updating a current observability rating of the respective property for the data signal to the computed observability rating.

FIG. 10 is an example of another method 1000 for computing a signal observability rating for a signal involved in a respective property. The method 1000 can be implemented by the property analyzer 126, as shown in FIG. 1. The method 1000 can begin at 1002 by propagating a first clock signal through a first module of a circuit design in a forward and backward direction. At 1004, evaluating first clock signal propagation results for the first module based on a forward and backward clock signal propagation of the first clock signal to compute a first observability rating for a data signal to be processed during formal verification of the second module. At 1006, propagating a second clock signal through a second module of the circuit design and through a portion of the first module in a forward and backward direction. At 1008, evaluating second clock signal propagation results based on a forward and backward clock signal propagation of the second clock signal to compute a second observability rating for the data signal to be processed during formal verification of the second module. At 1010, summing the first and second observability ratings to provide a summed observability rating for the data signal. At 1012, updating a current observability rating of the respective property for the data signal to the summed observability rating.

Figure 11:
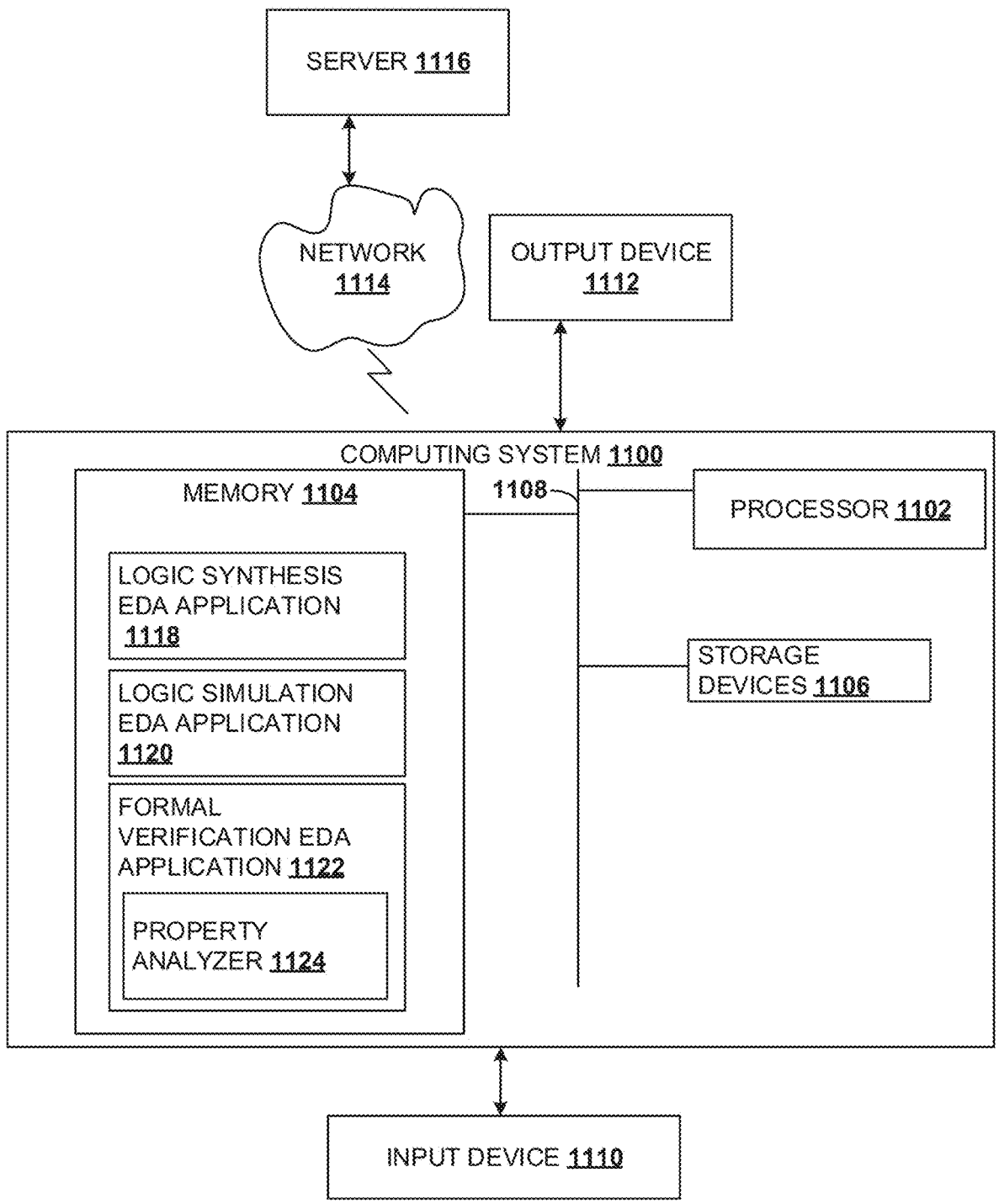
FIG. 11 illustrates an example of a computing system employable to execute a plurality of EDA applications and a property analyzer.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that include at least the minimum processing power, memory and input and output device(s) to perform one or more embodiments. As shown in FIG. 11, the computing system 1100 can include a computer processor 1102, memory 1104 (e.g., RAM, cache memory, flash memory, etc.), one or more storage devices 1106 (e.g., a solid state drive, a hard disk drive, an optical drive such as a compact disk (CD) drive or digital versatile disk (DVD) drive, a flash memory stick, etc.) and numerous other elements and functionalities. The computer processor 1102 may be an integrated circuit for processing instructions. For example, the computer processor may be one or more cores, or microcores of a processor. Components of the computing system 1100 can communicate over a data bus 1108.

The computing system 1100 may also include an input device 1110, such as any combination of one or more of a touchscreen, keyboard, mouse, microphone, touchpad, electronic pen, or any other input device. Further, the computing system 1100 can include an output device 1112, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 1112 can be the same physical device as the input device 1110. In other examples, the output device 1112 and the input device 1110 can be implemented as separate physical devices. The computing system 1100 can be connected to a network 1114 (e.g., a local area network (LAN), a wide area network (WAN) such as the Internet, a mobile network, or any other type of network) via a network interface connection (not shown). The input device 1110 and output device(s) 1113 can be connected locally and/or remotely (e.g., via the network 1114) to the computer processor 1102, the memory 1104 and/or the storage device 1106. Many different types of computing systems exist, and the input device 1110 and the output device 1112 can take other forms.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 1100 can communicate with a server 1116 via the network 1114.

The memory 1104 can include a plurality of EDA applications that can be employed to generate a circuit design and/or execute a simulation of the circuit design, and verification (e.g., formal verification). More particularly, the memory 1104 can include a logic synthesis EDA application 1118, a logic simulation EDA application 1120, and a formal verification EDA application 1122 or any combination of these EDA applications. The formal verification EDA application 1122 can execute property analyzer 1124 for implementing signal observability rating as disclosed herein. While the example of FIG. 11 illustrates the EDA application 1122 including the property analyzer 1124, the property analyzer 1124 may be located outside of the EDA application 1122. The property analyzer 1124 can correspond to the property analyzer 126, as shown in FIG. 1.

Further, one or more elements of the computing system 1100 can be located at a remote location and connected to the other elements over the network 1114. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising
propagating a clock signal through a respective module of a circuit design in a forward and backward direction;
evaluating clock signal propagation results for the respective module based on a forward and backward clock signal propagation of the clock signal to compute an observability rating for a data signal to be processed by the respective module during formal verification;
computing a sensibility list that includes the computed observability rating based on the evaluation of the clock signal propagation results; and
based on the sensibility list, updating a current observability rating of a respective property for the data signal to the computed observability rating.

2. The method of claim 1, wherein the current observability rating for the data signal is on both a positive edge and negative edge of the clock signal, and the computed observability rating for the data signal is on a respective one of the positive edge and the negative edge of the clock signal.

3. The method of claim 1, wherein the current observability rating for the data signal is on a positive edge of the clock signal, and the computed observability rating for the data signal is on the positive edge and a negative edge of the clock signal.

4. The method of claim 1, wherein the current observability rating for the data signal is on a negative edge of the clock signal, and the computed observability rating for the data signal is on a positive edge and the negative edge of the clock signal.

5. The method of claim 1, further comprising:
evaluating the current observability rating for the data signal involved in the respective property relative to the computed observability rating for the data signal to determine whether the current observability rating for the data signal is correct; and
generating an observability report indicating that the current observability rating for the data signal is incorrect in response to determining that the current observability rating does not equal the computed observability rating.

6. The method of claim 5, further comprising rendering the observability report on a display to alert a user that the current observability rating for the data signal is incorrect, wherein the current observability rating for the data signal is updated to the computed observability rating in response to a user input at an input device provided by the user.

7. The method of claim 6, wherein the clock signal is a first clock signal and the respective module is a first module, the observability rating is a first observability rating, the method further comprising:
propagating a second clock signal through a second module of a circuit design in a forward and backward direction; and
evaluating second clock signal propagation results for the second module based on a forward and backward clock signal propagation of the second clock signal to compute a second observability rating for the data signal to be processed by the second module during formal verification.

8. The method of claim 7, wherein the current observability rating is a first current observability rating, the method further comprising:
propagating a third clock signal through a third module of the circuit design and through a portion of the second module in a forward and backward direction;
evaluating third clock signal propagation results based on a forward and backward clock signal propagation of the third clock signal to compute a third observability rating for the data signal to be processed by the second module during formal verification;
summing the second and third observability ratings to provide a summed observability rating for the data signal that is to be processed by the second module; and
updating a second current observability rating of the respective property for the data signal to be processed by the second module to the summed observability rating.

9. The method of claim 8, further comprising:
propagating the third clock signal through the third module in a forward and backward direction;
evaluating fourth clock signal propagation results based on a forward and backward clock signal propagation of the third clock signal to compute a fourth observability rating for the data signal to be processed by the third module during formal verification; and
updating a third current observability rating of the respective property for the data signal to be processed by the third module to the fourth observability rating.

10. The method of claim 9, wherein the first current observability rating for the data signal that is be processed by the first module is on both of a positive and negative edge of the first clock signal, the second current observability rating for the data signal that is be processed by the second module is on both of a positive and negative edge of the second clock signal, and the third current observability rating for the data signal that is be processed by the third module is on both of a positive and negative edge of the third clock signal.

11. The method of claim 10, wherein the positive edge of the second clock signal can transition over a similar period of time as the positive edge of the first clock signal, such that the summed observability rating for the data signal that is to be processed by the second module is one of the positive edge and the negative edge of the first clock signal.

12. The method of claim 11, wherein the negative edge of the third clock signal can transition over a similar period of time as the negative edge of the first clock signal, such that the fourth observability rating for the data signal that is to be processed by the third module is on the negative edge of the first clock signal.

13. A method comprising:
propagating a first clock signal through a first module of a circuit design in a forward and backward direction;
evaluating first clock signal propagation results based on a forward and backward clock signal propagation of the first clock signal to compute a first observability rating for a data signal to be processed by the first module during formal verification;
propagating a second clock signal through a second module of the circuit design and through a portion of the first module in a forward and backward direction;
evaluating second clock signal propagation results based on a forward and backward clock signal propagation of the second clock signal to compute a second observability rating for the data signal to be processed by the first module during formal verification;
summing the first and second observability ratings to provide a summed observability rating for the data signal to be processed by the first module
computing a sensibility list that includes the computed first and second observability ratings based on the evaluations of the first and second clock signal propagation results; and
based on the sensibility list, updating a current observability rating of a respective property for the data signal to be processed by the first module to the summed observability rating.

14. The method of claim 13, further comprising:
evaluating the current observability rating for the data signal involved in the respective property relative to the summed observability rating for the data signal to determine whether the current observability rating for the data signal is correct; and
generating an observability report indicating that the current observability rating for the data signal is incorrect in response to determining that the current observability rating does not equal the summed observability rating.

15. The method of claim 14, further comprising rendering the observability report on a display to alert a user that the current observability rating for the data signal that is to be processed by the first module is incorrect, wherein the current observability rating for the data signal is updated to the summed observability rating in response to a user input at an input device provided by the user.

16. A system comprising
memory to store machine-readable instructions; and
one or more processors to access the memory and execute the machine-readable instructions, the machine readable instructions comprising:
a property analyzer programmed to:
propagate a clock signal through a respective module of a circuit design in a forward and backward direction;
evaluate clock signal propagation results for the respective module based on a forward and backward clock signal propagation of the clock signal to compute an observability rating for a data signal to be processed by the respective module during formal verification;
compute a sensibility list that includes the computed observability rating based on the evaluation of the clock signal propagation results; and
a report generator programmed to:
evaluate the current observability rating for the data signal involved in a respective property relative to the computed observability rating for the data signal to determine whether the current observability rating for the data signal is correct; and
generate an observability report indicating that the current observability rating for the data signal is incorrect in response to determining that the current observability rating does not equal the computed observability rating.

17. The system of claim 16, wherein the report generator is configured to render the observability report on a display to alert a user that the current observability rating for the data signal is incorrect.

18. The system of claim 17, wherein the current observability rating of the respective property for the data signal is updated to the computed observability rating in response to a user input at an input device provided by the user.

19. The system of claim 18, wherein the current observability rating for the data signal is on both a positive edge and negative edge of the clock signal, and the computed observability rating is on a respective one of the positive edge and the negative edge of the clock signal.

* * * * *